United States Patent Office 2,720,517
Patented Oct. 11, 1955

2,720,517

PROCESS FOR THE MANUFACTURE OF METALLIZABLE MONOAZO DYESTUFFS

Valentin Kartaschoff, Binningen, and Ernst Merian, Allschwil, Switzerland, assignors to Sandoz A. G., Basel, Switzerland, a Swiss firm No Drawing. Application February 2, 1953,
Serial No. 334,723

Claims priority, application Switzerland February 5, 1952

1 Claim. (Cl. 260—195)

The present invention relates to the manufacture of metallizable monoazo dyestuffs.

According to the present invention it has been found that very valuable monoazo dyestuffs are obtained by coupling a diazotised o-aminohydroxy-compound of the benzene or naphthalene series with an 8-hydroxy-naphthalene-1-acylamine preferably in presence of caustic alkali. The dyestuffs thus obtained may further be transformed into their metal complex compounds by treating them in substance by the usual processes employed in the dyestuff industry for this purpose.

By working under the aforesaid conditions, the ortho-hydroxydiazo-compounds couple with 8-hydroxy-naphthalene-1-acylamines in 7-position. The new monoazo dyestuffs correspond therefore to the formula

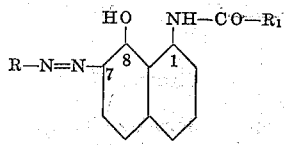

wherein R stands for a radical of the benzene or naphthalene series containing one hydroxy group in o-position to the azo-link and which can bear other substituents and wherein $R_1$ stands for hydrogen, lower alkyl, halogenated lower alkyl, lower alkoxyalkyl, lower aryloxyalkyl and lower alkylcarboxylic acid.

According to the selection of the starting compounds the new dyestuffs are more or less soluble in water and dye animal fibers by the one-bath chrome (the so-called metachrome process) or by the after-chrome process in blue, green to grey shades or great purity of shade, good wet-fastnesses and outstanding fastness to light. If the new dyestuffs are treated on the fiber with a cobalt yielding compound the resulting tints are, as compared to Cr-complexes more reddish in shade with very good fastness properties.

The dyestuffs obtained according to the present invention differ from the respective known dyestuffs prepared from 1-hydroxynaphthalene, 2-hydroxynaphthalene and 7-hydroxynaphthalene-1-acylamine as azo compound by their greener and more brilliant shade, by their better solubility in water, by their better fastness to light and in some cases by their considerably improved suitability for dyeing wool according to the so-called metachrome process.

As animal fibers which may be dyed with the monoazo dyestuffs of the present invention, we mean fibers like wool, silk and also fibers of similar dyeing properties like those made from casein (known under the name of "Thiolan" and "Lanital") or built up of polyamides and known under the trade names of "nylon," "Perlon," "Grylon" and so on.

The peri-acylamino derivatives of 8-hydroxynaphthalene used herein as azo compounds are generally known and can be prepared for instance in the same manner as described by Fichter et al. in Berichte der deutschen chemischen Gesellschaft, 39, 3331 (1906). For example the following compounds can be used for this purpose:

1-formylamino-8-hydroxynaphthalene,
1-acetylamino-8-hydroxynaphthalene,
1-propionylamino-8-hydroxynaphthalene, and
1-butylamino-8-hydroxynaphthalene.

As diazo components there can be used for example the mono- and disulfonic derivatives of 1-amino-2-hydroxynaphthalene and 2-amino-1-hydroxynaphthalene respectively and their halogeno, nitro, alkyl, acyl and alkoxy derivatives, like 1-amino-2-hydroxynaphthalene-4-sulfonic acid,
1-amino-2-hydroxy-6-nitronaphthalene-4-sulfonic acid,
1-amino-2-hydroxynaphthalene-4.6-disulfonic acid and so on, the 2-amino-1-hydroxybenzene and its derivatives as for instance the 4-chloro-2-amino-1-hydroxybenzene-6-sulfonic acid,
the 4-nitro-2-amino-1-hydroxybenzene-6-sulfonic acid,
the 4-alkyl-2-amino-1-hydroxybenzene-6-sulfonic acid,
the 4-chloro-5-nitro-2-amino-1-hydroxybenzene-6-sulfonic acid,
the 4-benzoylamino-2-amino-1-hydroxybenzene-6-sulfonic acid,
the 4-bromo-2-amino-1-hydroxybenzene-6-sulfonic acid and
the 3.4.6 - trichloro - 2 - amino - 1 - hydroxybenzene - 5 - sulfonic acid.

According to the present invention coupling takes place in 7-position of the 1-acylamino-8-hydroxynaphthalene, whereas by working in the usual manner the diazo compound couples more or less exclusively in 5-position giving only small quantities of the desired monoazo dyestuff. The corresponding 5-isomers dye wool when afterchromed in brownish shades of poor fastness to light.

It is, therefore, a primary object of the present invention to provide a process which makes it possible to produce the monoazo dyestuffs of the above formula, the coupling of the components taking place in a concentrated caustic alkaline bath, so adjusted that the acylamino group remains unsaponified.

Still another object of the present invention is the transformation of the dyestuffs of the above formula into their heavy metal complex compounds by treating them with heavy metal salts in substance or on the fiber, whereby as metals Cr and Co are preferably used.

It has furthermore been found that the new monoazo dyestuffs of the above formula may also be obtained by treating dyestuffs of the general formula

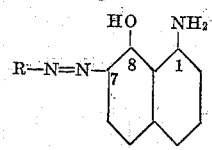

wherein R stands for a radical of the benzene or naphthalene series containing one hydroxy group in o-position to the azo-link and which can bear other substituents, with an aliphatic carboxylic acid or with a functional derivative thereof. The starting monoazo compounds are produced either by coupling the diazotized o-aminohydroxy compounds of the benzene or naphthalene series in a strong alkaline medium with 1-amino-8-hydroxynaphthalene or by coupling them with 1.8-naphthalenediamine and partially hydrolyzing the obtained monoazo dyestuffs for instance by boiling them in diluted acid medium, whereby the amino group in o-position to the azo-link becomes replaced by a hydroxy group.

The following examples, without being limitative, illustrate the present invention, the parts being by weight. The temperatures are in degrees centigrade.

*Example 1*

5 parts of 1-acetylamino-8-hydroxynaphthalene are dissolved in 50 parts of a 23% solution of sodium hydroxide at 5°, 57 parts of a 42% solution of sodium hydroxide are added, whereupon 5.8 parts of 1-diazo-2-hydroxynaphthalene-4-sulfonic acid are introduced with good stirring. By diluting the mixture with small quantities of water the coupling can be accelerated. The new mono-azodyestuff is isolated by adding 500 parts of water and precipitating the dyestuff with hydrochloric acid. It can be purified after filtration by dissolving it in diluted sodium carbonate solution and salting out with common salt.

The new monoazo dyestuff is a dark powder, which is soluble with a pure blue color in concentrated sulfuric acid and with a bluish-red color in sodium hydroxide solution. It dyes animal fibers from an acid bath in cobalt-blue shades which turn to greenish grey when after-chromed. The dyeings obtained possess very good light, potting-, washing, fulling- and carbonising fastnesses.

The new monoazo dyestuff has the formula

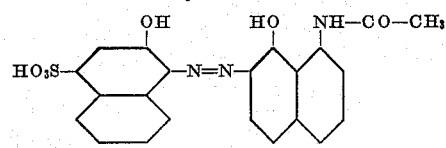

Dyestuffs possessing similar properties correspond to the following formulae:

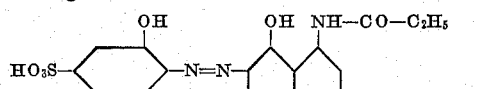

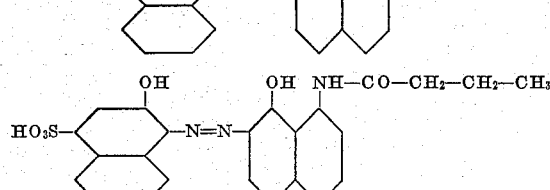

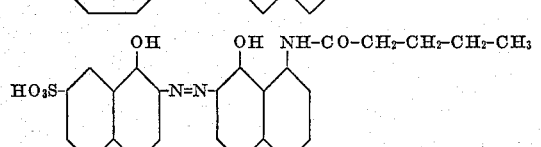

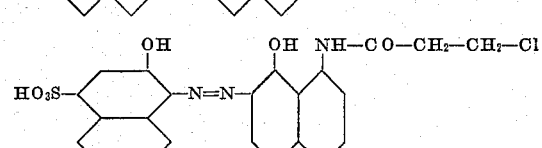

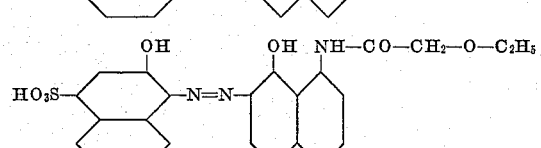

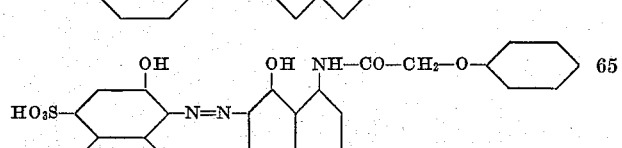

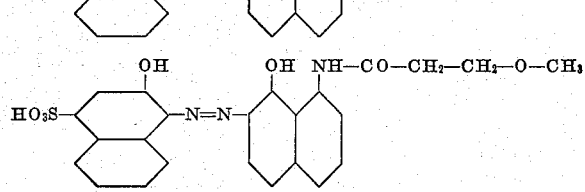

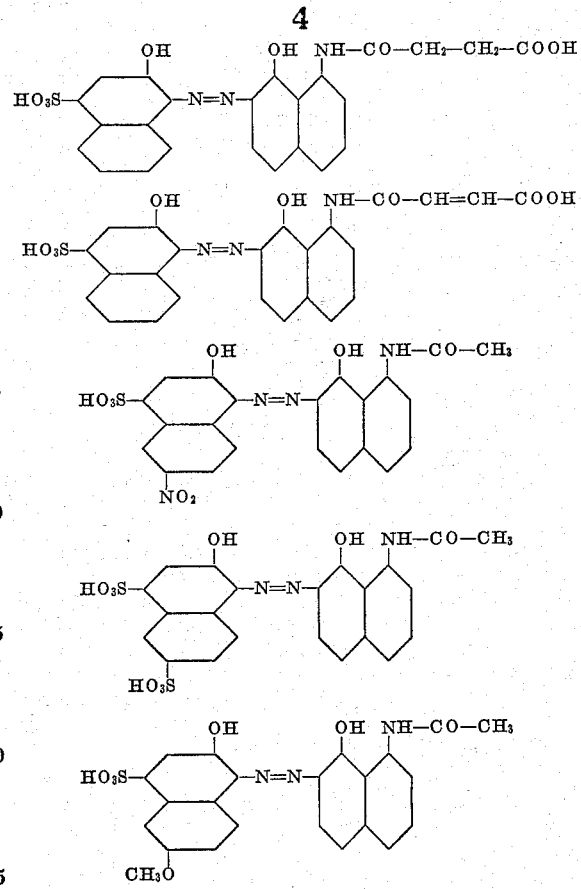

*Example 2*

22.4 parts of 4-chloro-2-amino-1-hydroxybenzene-6-sulfonic acid are stirred in 50 parts of water and dissolved by addition of 14 parts of 35% caustic soda solution. 7 parts of sodium nitrite are added and the solution is then poured onto 24 parts of concentrated hydrochloric acid and 130 parts of ice. When the diazotization is terminated, 60 parts of sodium chloride are added, whereupon the resulting diazo compound is isolated by filtration. It is then stirred in a mixture of 64 parts of ice and 296 parts of 35% caustic soda solution at 0° and a solution of 20.1 parts of 1-acetylamino-8-hydroxynaphthalene in a mixture of 17 parts of ice and 23 parts of 35% caustic soda solution is then added drop by drop. When coupling is complete, the reaction mass is diluted with 400 parts of water and neutralized with 158 parts of concentrated hydrochloric acid. The suspension thus obtained should before filtration react just weakly to brilliant yellow. The filtrate contains some useless 5-azodyestuff. The isolated 7-azodyestuff is washed with small quantities of water and dried. If a very pure dyestuff is desired, it can be redissolved. The resulting powder is dark blue and is soluble in concentrated sulfuric acid with an ultramarine color. The new dyestuff has the following formula

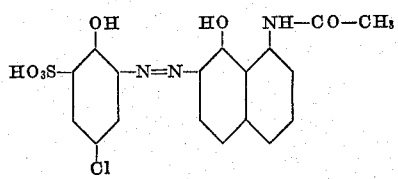

and dyes wool from an acid bath in red-violet shades. By afterchroming very pure greenish blue shades are obtained which possess outstanding light-, potting-, washing-, fulling- and carbonizing properties. The new dyestuff is furthermore very suitable to be dyed according to the so-called metachrome process, just in contradistinction to the isomeric grey dyestuff, which is obtained by coupling 4-chloro-2-diazo-1-hydroxybenzene-6-sulfonic acid with 1-acetylamino-7-hydroxynaphthalene. The analogous dyestuffs obtained from 1- and 2-hydroxynaphthalene as azo components are much redder in shade and all three compared old dyestuffs are much inferior with regard to light fastness.

The new dyestuff can be transformed on the fiber into its cobalt complex in following manner. For instance a dyebath is prepared of 4000 parts of water, 4 parts of sulfate of ammonia, 4 parts of cobalt acetate and 3 parts of the dyestuff. At 50–60° 100 parts of well wetted wool are entered, while raising the temperature to the boil. After one hour the dyed material is rinsed and dried. It is colored in a pure violet shade possessing outstanding fastness to light-, washing and carbonizing.

*Example 3*

13.5 parts of 4-nitro-2-amino-1-hydroxybenzene-6-sulfonic acid are stirred in 30 parts of water and 6 parts of concentrated hydrochloric acid diazotized with 17.5 parts of a 20% solution of sodium nitrite. The diazo compound is precipitated at 0° with common salt, isolated by filtration and added to a mixture of 10 parts of 1-acetylamino-8-hydroxynaphthalene (dissolved in 50 parts of 20% caustic soda solution) and 140 parts of 34% caustic soda solution at 0°. After complete coupling the useless isomeric 5-azodyestuff is separated and the new monoazo dyestuff is isolated. It forms a black powder which is soluble in concentrated sulfuric acid with a blue-grey color and which has the following formula

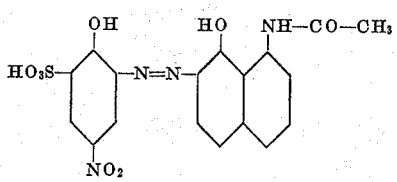

It dyes animal fibers when afterchromed or by the so-called metachrome process in grey-green shades.

*Example 4*

9 parts of 4-chloro-2-amino-1-hydroxybenzene-6-sulfonic acid are stirred in 16 parts of water and 4 parts of concentrated hydrochloric acid, whereupon 14 parts of a 20% solution of sodium nitrite are added at 0°. The resulting diazo compound is salted out, filtered and added at 0° to a solution of 8.6 parts of 1-propionylamino-8-hydroxynaphthalene in 50 parts of a 20% caustic soda solution. Directly afterwards 40 parts of 35% caustic soda solution are added. When coupling is terminated, the reaction mass is diluted with water, the dyestuff separated from useless byproducts and dried. It is soluble in concentrated sulfuric acid with a blue-grey coloration and has the following formula

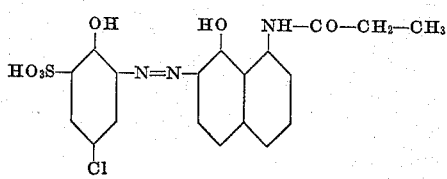

It dyes animal fibers when afterchromed and according to the so-called metachrome process in blue shades.

*Example 5*

If in the preceding example 8.6 parts of 1-propionyl-amino-8-hydroxynaphthalene are replaced by 7.4 parts of 1-formylamino-8-hydroxynaphthalene an analogous dyestuff is obtained which has the following formula

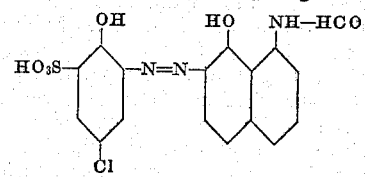

*Example 6*

44 parts of the dyestuff of Example 2 are dissolved at 90° in 600 parts of water and 150 parts of a solution of chromosalicyclic ammonia (corresponding to 11 parts of chromium trioxide) are added. The reaction mass is then boiled for 6 hours, salted out at 20° and the metallized dyestuff filtered. It is in dry state a blue-black powder soluble in diluted caustic soda solution with a red-violet and in concentrated sulfuric acid with a blue-green coloration. The new chromium complex dyes animal fibers from a neutral to weak acid bath in blue shades of very good fastness to light.

*Example 7*

44 parts of the dyestuff of Example 2 are stirred in 400 parts of water at 60° and the pH value adjusted to 1.7–1.8 by means of addition of 10% hydrochloric acid. Then a solution of 29 parts of chromium formate in 50 parts of water are added. The temperature is raised to 100° and the solution boiled 24 hours long. The resulting dyestuff is filtered at room temperature and washed free from acid. The new dyestuff is water insoluble in the form of the free acid while the sodium salt thereof dissolves with a red-violet coloration. It dyes wool from a weak acid bath in blue shades of good fastness properties.

*Example 8*

14 parts of chromium formate are heated while stirring with 300 parts of formamide and 100 parts of water up to 115–120°. After 2 hours 44 parts of the dyestuff of Example 2 are added thereto and stirring continued for 16 hours at 115–120°. Then the reaction mass is poured onto 1000 parts of water and the new chromium complex is precipitated by addition of common salt. The product thus obtained is soluble in water with a pure blue, in diluted caustic soda solution with a ruby-red and in concentrated sulfuric acid with a grass-green coloration. It dyes animal fibers from a neutral to weak acid bath in pure blue shades, which possess excellent fastness properties.

*Example 9*

44 parts of the dyestuff of Example 2 are heated to the boil with 600 parts of water and 18 parts of cobalt tartrate. Metallization is soon terminated and the resulting cobalt complex isolated by addition of common salt. The new dyestuff is a dark powder which is soluble in water with a red-violet and in concentrated sulfuric acid with a blue-grey coloration. It dyes animal fibers from a weak acid bath in pure violet shades of excellent properties.

To make it quite clear how the so-called metachrome process is to be executed, the following Example 10 illustrates this dyeing process without being limitative, however.

*Example 10*

Well scoured and rinsed wool piece is first treated in a bath containing 4% of ammonium chromate and 4% of ammonium sulfate on the weight of the goods for about 15 minutes at 60°. This ensures a thorough wetting out of the material and serves to equalize the pH value of the wool. Then 2.5% on the weight of the goods of the dissolved dyestuff of Example 2 are added at 45°, whereupon the dyebath is raised to the boil in about 45 minutes and dyeing continued for 1–1½ hours. Uniform blue shades of outstanding purity and excellent all-round fastness properties are obtained.

Having thus disclosed the invention, what is claimed is:

A process for the manufacture of a monoazo dyestuff, comprising coupling a diazo compound of a member selected from the class consisting of o-amino-hydroxy benzene sulfonic acids and o-aminohydroxy naphthalene sulfonic acids in a concentrated caustic alkaline medium with 1-acylamino-8-hydroxynaphthalene, said alkaline medium containing at least 20% of caustic alkali based on the weight of the liquid phase, whereby the acylamino group remains unsaponified.

References Cited in the file of this patent

UNITED STATES PATENTS

| | | |
|---|---|---|
| 1,052,262 | Levinstein et al. | Feb. 4, 1913 |
| 1,078,925 | Kahn et al. | Nov. 18, 1913 |
| 1,408,297 | Herzberg et al. | Feb. 28, 1922 |